Oct. 23, 1945.　　　W. W. LOWTHER　　　2,387,278
OIL WASHED AIR CLEANER
Filed March 10, 1942　　　3 Sheets-Sheet 3

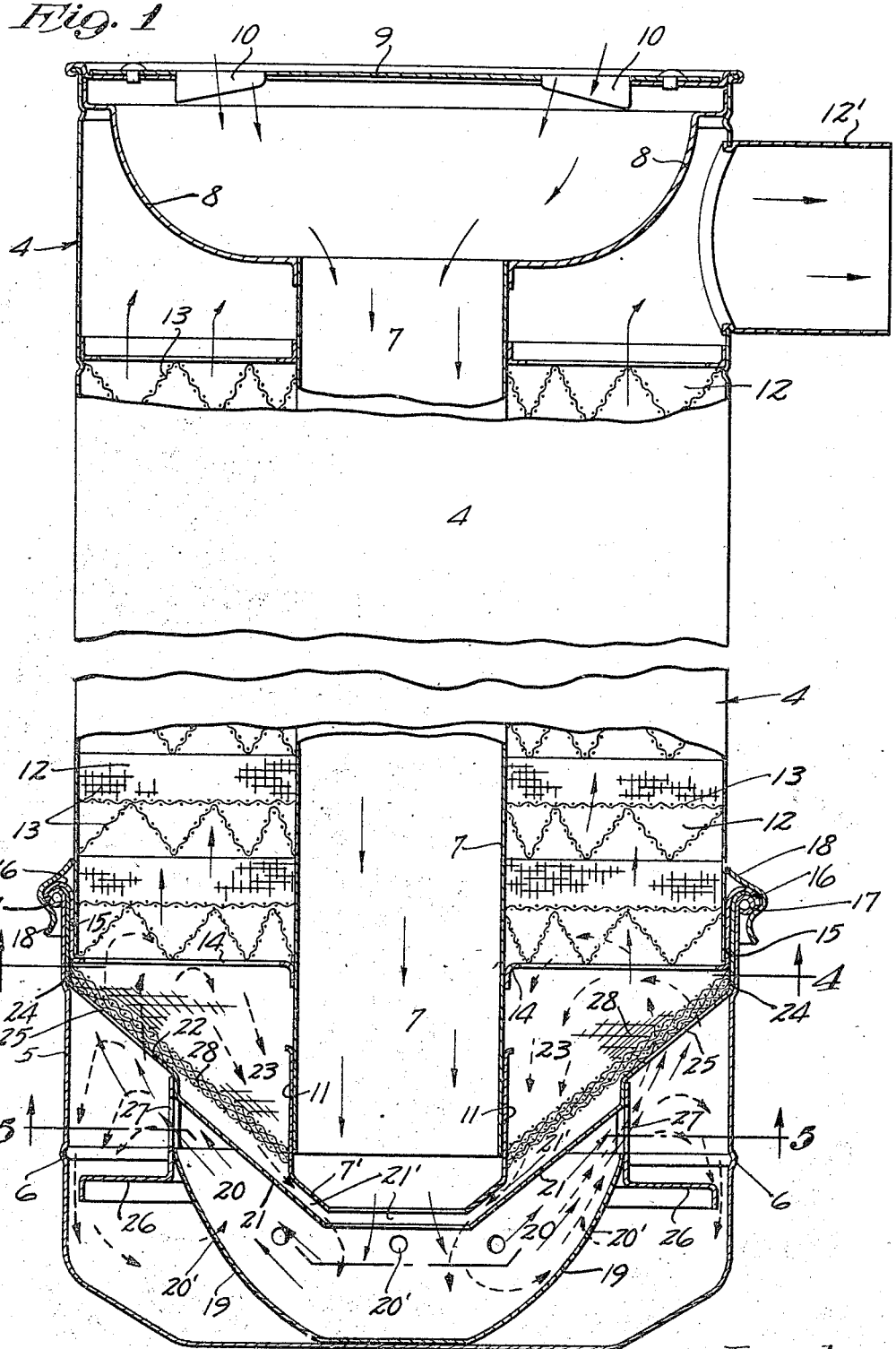

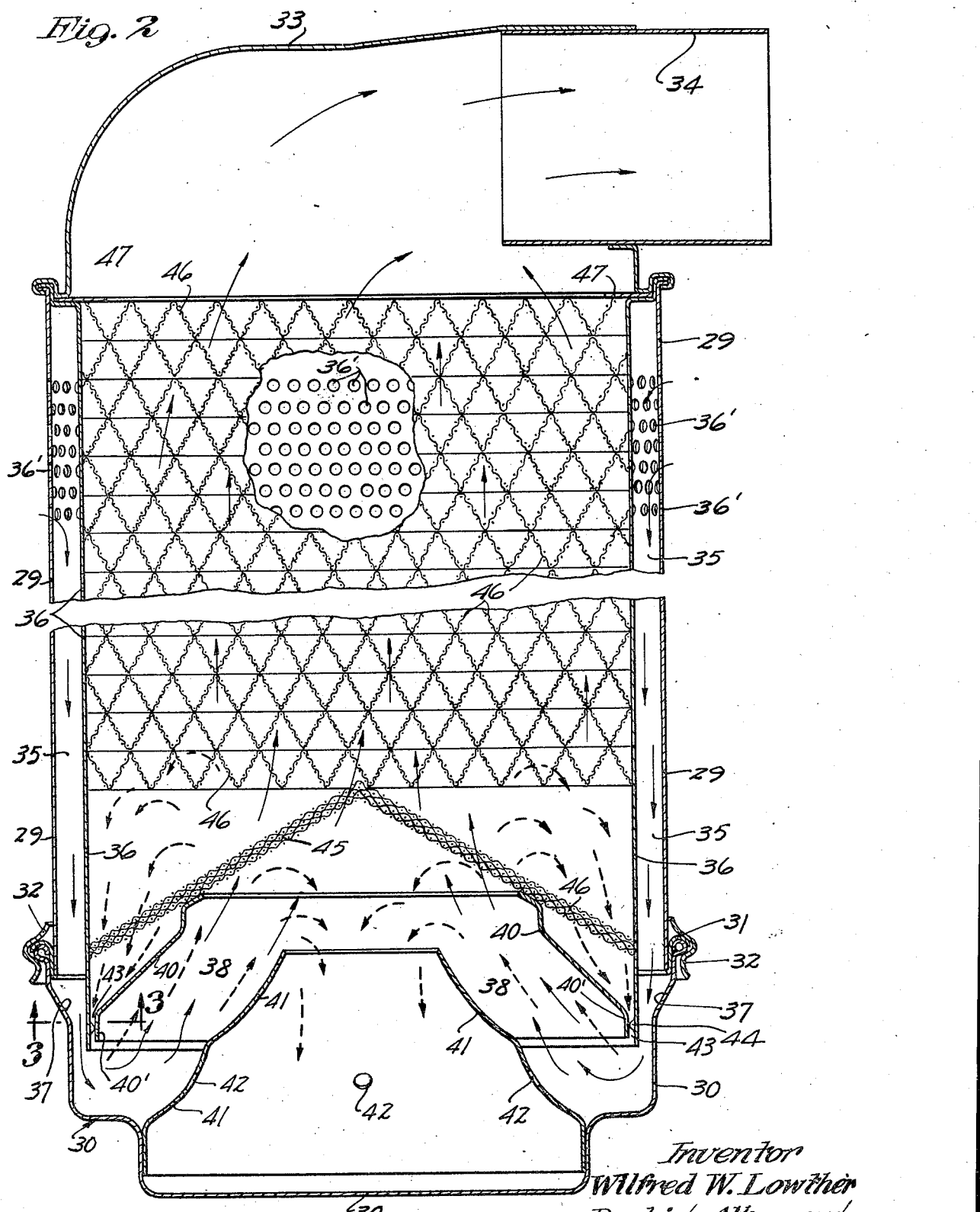

Inventor
Wilfred W. Lowther
By his Attorneys
Merchant & Merchant

Patented Oct. 23, 1945

2,387,278

UNITED STATES PATENT OFFICE 2,387,278

OIL WASHED AIR CLEANER

Wilfred W. Lowther, Minneapolis, Minn.

Application March 10, 1942, Serial No. 434,071

3 Claims. (Cl. 183—15)

My present invention relates to improvements in air cleaners of the liquid wash type, which contain a body of liquid, usually oil, and which are particularly adapted for use in connection with the air intakes of internal combustion engines, compressors and analogous devices.

Air cleaners of this liquid wash type embody a casing defining a liquid well or reservoir in its bottom and an expansion chamber above the liquid well and are customarily provided with an air outlet from the upper portion of the expansion chamber and an air inlet conduit discharging downwardly into the liquid well. In most cleaners of this type a large part of the liquid that is normally in the liquid well or reservoir under static conditions is induced into the expansion chamber above the liquid well by air passing between the inlet and outlet under operating conditions and in some prior art cleaners of this type more or less of a circulation of liquid has been maintained between the liquid well and expansion chamber under operating conditions. All air cleaners of this liquid wash type present two major problems which are as follows, to wit, (a) the thorough commingling of air and liquid with the view of catching the highest possible percentage of dust particles in the liquid; and (b) the separation of the liquid from the air before it reaches the cleaner's outlet.

With the above in mind, attention is directed to the fact that air cleaners of this liquid-body containing type may broadly be divided into two classifications which are as follows, to wit (1) those employing a tightly packed filter in the expansion chamber thereof between the liquid well and outlet for filtering out such dust as is carried past the washing zone in or immediately adjacent the liquid well and for removing from the air stream liquid that might otherwise be carried over to the outlet; and (2) those liquid body containing cleaners employing, in place of tight packed filters, only relatively very pervious filter element or elements such as are shown in my prior Patents Nos. 2,130,142 and 2,000,706, for example, and which type of elements usually consist of stacked corrugated wire screens of relatively coarse variety. Coarse and highly pervious filter elements of this character are less efficient, from oil trapping point of view, than are the tight packed filter elements and have much less dust collecting and retaining capacity than do oil soaked filters of the tight packed type.

Tight packed filters of the type defined under (1) above, and which usually consist of tightly packed crinkled wire, metal shavings, or fibrous substance such as horsehair or moss, are found objectionable because they tend to plug and require relatively frequent servicing under adverse conditions but have been considered as necessary in some instances for the purpose of bringing the over-all efficiency of some cleaners up to a necessarily high standard and in other cases have been considered necessary for the purpose of preventing a carry over of oil into the cleaner's outlet. On the other hand, cleaners of the kind disclosed in my above identified prior patents obtain such a high degree of air cleaning efficiency by oil washing alone as to make it unnecessary to resort to a tight packed filter for this purpose but, while avoiding the inherent disadvantages of tight packed filters, have been objected to on the grounds that more or less liquid, usually oil, would be carried over into the cleaner's outlet, thereby gradually diminishing the liquid supply in the cleaner and producing an undesirable wet condition in the intake.

An important object of the present invention is the provision of an improved air cleaner of the so-called liquid wash or bath type wherein the air cleaning efficiency by liquid washing action within or in the immediate vicinity of the cleaner's liquid reservoir will be greatly improved.

Another important objective of the invention is the provision of an improved air cleaner of the liquid wash or bath type wherein cleaning liquid carried by the air stream into the space between the cleaners inlet and outlet will be largely directed out of the main air stream and turned back toward the liquid well immediately beyond the oil washing zone. In this connection it may be said that cleaners constructed in accordance with the present invention maintain a constant and high volume circulation of liquid into and out of the incoming air passing through an air washing zone in the immediate vicinity of the oil well or reservoir and carry beyond this washing zone only a small part of the entrained liquid which is easily intercepted in the expansion chamber and directed back toward the well. Hence, even in very condensed and highly efficient cleaners made in accordance with the present invention the use of tight packed filters either for the purpose of increasing the efficiency of the cleaner or preventing a carrying over of oil to the outlet becomes unnecessary.

Another highly important object of the present invention is the production of an air cleaner of the liquid wash or bath type in which a greater efficiency is obtained for a cleaner of given physical size.

Still another highly important object of the invention is the provision of an improved cleaner of this liquid wash or bath type in which the restriction to air passage will be relatively low at all times and will remain constant between service intervals.

The above and other highly important objects and advantages of the invention will be made apparent from the following specification, claims and appended drawings.

In the accompanying drawings like characters indicate like parts throughout the several views.

Referring to the drawings:

Fig. 1 is a view in side elevation, with some parts broken away and some parts shown in vertical axial section, showing the invention embodied in an air cleaner of the center tube inlet variety;

Fig. 2 is a view in vertical axial section showing the invention embodied in a cleaner of the marginal inlet variety;

Figure 4:
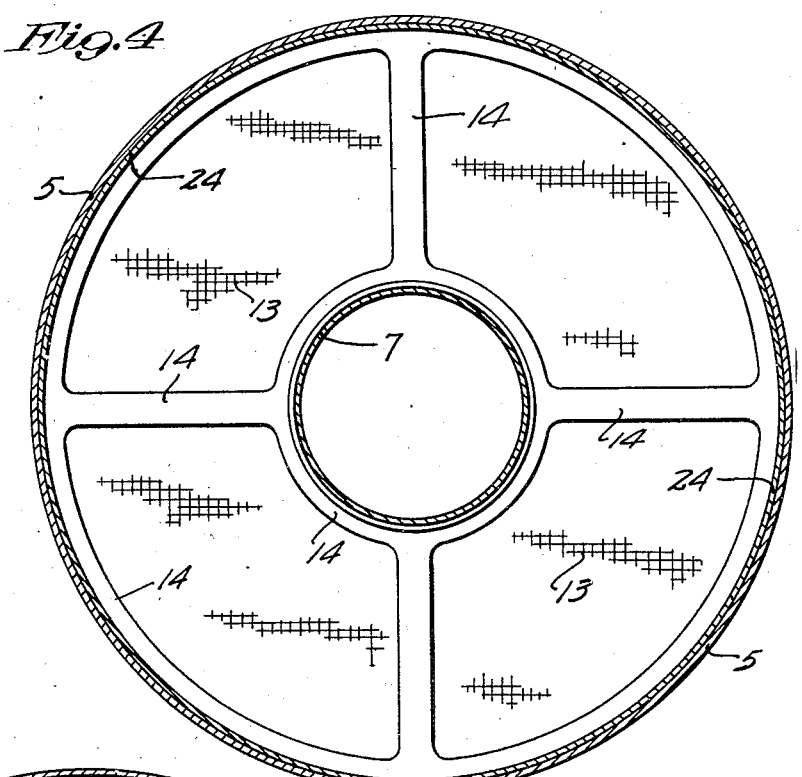
Fig. 4 is a transverse horizontal sectional view taken on the line 4—4 of Fig. 1.

The air cleaner of Fig. 1 will first be described. This air cleaner involves an outer casing or shell that is preferably in the form of an upright cylinder 4 and is primarily open at its bottom but is completed and normally closed at its bottom by a cup-shaped element 5. The cup-shaped element 5 defines a liquid well or reservoir and has a circumferentially extended outwardly pressed bead 6 for indicating the normal static liquid level therein. Extending axially downwardly through the casing and terminating with its lower end in spaced relation to the bottom of the liquid well or reservoir is a tubular air conduit wall 7 providing an intake passage. The upper end of this tubular air intake conduit 7 is rigidly secured to and supported from a concave baffle member 8 having its outer peripheral portion rigidly secured to the upper end of the cylindrical shell 4 and closing the upper end of the space between the intake conduit 7 and shell. The open upper end of the concave baffle 8 is largely closed by a casing head plate 9 that is provided with a circumferentially spaced plurality of air intake ports 10. While the upper structure of this cleaner just described constitutes no part of the present invention, it may be said that the chamber formed between the baffle walls 8 and 9 constitutes a backfire oil trap and that the ports 10 are spaced radially outwardly of the wall of the tubular intake conduit 7 so that liquid upwardly directed through the tube 7 under backfire conditions will strike directly against the closed central portion of the baffle 9 and drain back to the well through conduit 7.

The intake conduit 7 forms a primary air intake passage and is preferably contracted at its terminal end portion to provide a restricted throat portion 7' therebetween and the secondary part of the air inlet passage hereinafter to be described. Preferably this contraction of the terminal end of the conduit 7 is provided in a sleeve 11 telescoped on to and rigidly secured to the end of the main section of the conduit 7 and forming a continuation thereof.

Overlying that portion of the oil or liquid well radially outwardly of the intake tube is an expansion chamber 12 of annular form, the inner wall thereof being the intake tube 7 and the outer wall thereof being the shell 4. Leading from the upper portion of the expansion chamber 12 is an air outlet sleeve 12' that is adapted to be coupled in the usual fashion to the air intake of an internal combustion engine or analogous device. The expansion chamber 12 preferably contains a highly porous liquid intercepting element or filter 13 which, as shown, is made up of a plurality of stacked corrugated woven wire screens which may be assumed to be of the character disclosed in patents before identified or in the Scholz Patent No. 2,011,303 of August 13, 1935. As previously indicated, this type of intercepting element is not as highly efficient as an oil and dust intercepting medium as is a tight packed filter, but has the advantages of offering far less restriction to air flow than a tight packed filter and being less subject to plugging.

The intercepting means 13, made up of stacked screens, is supported by the marginal edge flanges and connecting spokes or webs 14 of a sheet metal retainer whose annular marginal edge portion 15 is turned upwardly and telescopically fit over the open end of the shell section 4. The annular flange 15 of the screen retaining element is preferably welded or otherwise rigidly secured to the shell or casing and is outwardly and downwardly turned at its upper end to provide an internally upwardly concave clamping flange 16 in which is seated the outwardly rolled or beaded edge 17 of the well-forming casing element 5 which is detachably held in place by a suitable split and resilient clamping band 18 which is transversely channel-shaped.

Mounted on and secured fast to the bottom of the cup-like liquid well-forming element 5 by welding, soldering, or the like, is a cup-like baffle element 19 which, as will hereinafter be seen, forms the lower wall of an annular secondary air intake passage 20. This cup-like baffle element 19 is disposed co-axially of the cleaner directly below the primary intake conduit 7 and preferably upwardly terminates approximately at the normal static oil level in the well. Preferably the side walls of this inner oil cup or baffle element 19 flare outwardly and upwardly from its bottom toward its upper edge and has a maximum radius approximately midway between that of the primary intake conduit 7 and the inner wall of the casing. Midway between its top and bottom, the cup-like baffle element 19 is provided with a circumferentially spaced series of oil passages 20' which provide leakage communication between the interior of the inner cup 19 and that portion of the oil well outside of said inner cup.

The upper wall of the annular secondary air inlet passage, above referred to, is formed by an upwardly and outwardly flaring, conical, annular baffle 21. The axial opening through this annular baffle 21 is substantially the same diameter as or slightly greater than that of the contracted terminal end of the primary air inlet conduit and is concentrically disposed with relation to the latter. This baffle 21 outwardly terminates in a circular marginal edge 22 in a horizontal plane materially above the terminal end of the intake conduit 7, and said baffle 21 forms therebetween and the discharge end portion of the conduit 7 an annular quiescent zone 23 thereabove in the expansion chamber wherein oil precipitated from the air stream will collect and build up a head. Important it is to note, however, is the fact that the radially inner portion of the baffle 21 is concentrically spaced from the contracted throat portion 7' of the intake tube 7 to provide a narrow annular liquid return passage from the quiescent zone 23 to the annular secondary air intake passage between baffle walls 19 and 21 and which is largely within the liquid well. The baffle wall 21 is formed integrally with an annular coupling flange 24 that is slidingly telescopically applied between the upper portion of the cup-like portion of the casing and the flange 15 of the screen supporting element. The flange 24 has an outwardly and downwardly rolled upper edge that is disposed between the clamping flange 16 and the rolled upper edge of the cup-like element 5 of the casing. Preferably the cup-like casing element 5 is slightly contracted just below the flange 24 to provide an annular seat for the latter. The flange 24 and baffle element 21 are connected only by widely spaced narrow spokes 25 which leave a substantially nearly completely annular opening between the upper edge of baffle 15 and the expansion chamber.

Mainly for the purpose of preventing undue splashing of liquid under rocking and jarring of the cleaner, I have provided an annular splash baffle 26 which projects outwardly from the upper edge of the inner cup or baffle element 19 and terminates in radially spaced relation to the periphery of the main oil cup so as to permit free oil communication therepassed. This baffle 26 is preferably rigidly anchored to the upper baffle element 21 by circumferentially spaced upright legs 27 that span the passage between the baffle elements 19 and 21. The legs 27 may be assumed to be welded or soldered to the baffle 21, and the baffle 26 may be assumed to have sliding telescopic engagement with the terminal edge portion of baffle 19.

With the structure last described, it will be evident that when the clamping band 16 is removed, the oil well forming cup-like casing element 5 and baffle element 21 may be removed as a unit, after which the baffle element 21 and splash baffle 23 may be removed as a unit from the cup 5 so as to permit maximum ease of cleaning of the parts.

Preferably the annular opening spanned by the baffle-anchoring spokes 25 is also spanned by a finely and closely perforated, sieve-like conical annular baffle element 28 that slopes downwardly and inwardly toward the quiescent zone 23 of the expansion chamber and may and is herein illustrated as also spanning the said quiescent zone. This sieve-like element 28 is preferably made up of superimposed layers of woven wire screen and has as its main function the directing of oil carried therethrough diagonally of the direction of air flow and in the direction of the quiescent zone. This function, however, will be elaborated on later.

The following relation of cross-sectional areas is desirable. The minimum cross-sectional diameter of the annular secondary passage defined by baffles 19 and 21 is materially greater than the orifice leading from the contracted throat 7' of the inlet tube and is preferably greater than the maximum cross-sectional area of the inlet tube. While the cross-sectional view of Fig. 1 indicates that the passage between baffles 19 and 21 is progressively narrower toward its outer periphery, attention is directed to the fact that the cross-sectional area is progressively greater from its inner toward its outer edge due to the rapid increase in diameter of the conical passage. The minimum cross-sectional area of the annular passage from the secondary inlet passage through the annular passage spanned by spokes 25 and screen 28 is greater than that of the passage between the baffles 19 and 21; and the minimum open cross-sectional area of the expansion chamber 12 is greater than that of any of the passages just noted above. Furthermore, it is important to note that the minimum cross-sectional area of the oil return passage from the quiescent zone is materially less than that of any of the passages heretofore mentioned.

*Operation of device of Fig. 1*

It will be assumed that the oil well of the cleaner has been filled to the level of the bead 6 with a suitable liquid which may be assumed to be oil since this is most customarily employed as a cleaning fluid. When the engine, to which the outlet sleeve 12' is connected, is started the pistons thereof will produce a suction which will cause a rapid air flow through the cleaner. This air will enter the circumferentially spaced inlet ports 10 and will be directed downwardly through the axial air inlet conduit 7 wherefrom it will be projected into the inner oil cup or baffle 19 which will initially be filled to its upper edge with fluid. Of course, as the incoming air passes the contracted throat portion 7' its velocity will be greatly increased as in a Venturi tube, and as the air passes from the delivery end of the primary air inlet conduit, it will be expanded and its velocity will be decreased within the less restricted secondary passage between the annular baffles 19 and 21. As this air passes upwardly and outwardly through the annular passage between baffles 19 and 21, it will carry with it most of the liquid normally in the cup-like baffle 19. Some of this oil carried outwardly through the annular secondary passage will be thrown out of the main air stream immediately beyond the upper edge of cup-like baffle 19 and will return to the liquid well but much of the liquid thus carried beyond the peripheral edges of baffle walls 19 and 21 will be carried into and passed through the conical baffle screens 28 and into the expansion chamber. Of course, as the air passes through the screen covered annular opening into the expansion chamber, it will further expand and lose further velocity and this expansion in itself will tend to direct some of the oil carried thereby radially inwardly in the direction of the quiescent zone inwardly of the peripheral edge of baffle 21.

It will be understood, of course, that the air passing over the peripheral edge 22 of baffle 21 will tend to expand upwardly and inwardly toward the conduit 7 but will actually leave a more or less undisturbed or quiescent zone above the baffle 21. The tendency, however, to throw oil inwardly toward the quiescent zone is increased by the screens 28 which function substantially as follows. The oil carried into the screens 28 will tend to form films over the openings therein, and when these films break, they break from all edges at the same time and are dispersed in a direction substantially at right angles to the upper surfaces of the screens which is diagonally inwardly of the direction of air flow. Hence, with the screens a very much increased percentage of the entrained liquid will be thrown out of the air stream immediately above the screens and permitted to gravitate into and build up a head of oil in the quiescent zone. In practice it is found that a head of oil will be maintained at least up to the upper edge of baffle 21 and this oil is very rapidly returned to the air inlet stream through the annular oil return passage 21' by the combined action of gravity and suction. It will be seen that the rapid expansion of the rapidly moving column of air passing the terminal end of the oil return passage 21' will produce a higher degree of vacuum or sub-atmospheric pressure than exists in any other point of the cleaner and that this will cause a rapid and high volume dispensation of oil into the secondary air passage and in a direction transversely of the line of air flow. Under continuous operation, the head of oil in the quiescent zone is constantly maintained in spite of the rapid withdrawal of liquid therefrom, and a large part of the annular stream of oil thrown into the secondary air passage passes all the way across the annular air stream to the inner surface of baffle 19 wherefrom it is continuously carried upwardly and discharged over the edge thereof for a return to the outer peripheral portion of the oil well and ultimate return to the secondary air passage of the oil well through the small passages 20' therein. However, much of the oil introduced back into the air stream through the oil return passage 21' is violently mixed with the air and continuously returned to the expansion chamber in the manner previously described. In spite of the violent whipping up by and mixing of air in the secondary passage with oil, an exceptionally high percentage of the oil carried into the lower portion of the expansion chamber will be thrown out of the main air stream before it is carried far into the expansion chamber, and there is so little remaining in the air stream during its passage through the intermediate portions of the expansion chamber that no difficulty is experienced in intercepting this oil and returning the same to the oil well through the medium of the intercepting screens 13. Experience has shown that a dry outlet can be expected with this structure and that the over-all air cleaning efficiency is exceptionally great.

As was also previously indicated, the air cleaning action takes place largely within the oil well and lower extremities of the expansion chamber by an oil washing action which coats the dust particles and foreign substance with oil which carries the same out of the air stream and into the oil well where it ultimately accumulates in that portion of the well outwardly of the cup.

In Fig. 1 the general direction of air travel through the cleaner is indicated by full line arrows, and the general direction of oil flow in the cleaner is indicated by broken line arrows.

In Fig. 2 the shell or casing of the cleaner is also in the nature of a vertically disposed cylinder, such being indicated as an entirety by 29. This cylindrical shell 29 is primarily open at its bottom but is normally closed by a cup-like oil well-forming element 30 telescoped over the lower end portion of the main casing element 29. The casing element 29 is provided in spaced parallel relation to its lower edge with a rigidly secured outwardly projecting clamping flange 31 having a concave under surface in which is seated the rolled upper edge of the cup 30. The casing elements 29 and 30 are detachably clamped together by means of a split channel-shaped clamping band 32. The upper end of the casing is closed by a head element 33 having a sleeve-equipped outlet port. The sleeve from this outlet port is indicated by 34 and is adapted to be connected by a suitable conduit or the like to the intake of an internal combustion engine or analogous device.

A primary marginal air inlet passage 35 is defined by the outer shell 29 and a concentrically disposed depending skirt 36. The skirt 36 is rigidly secured to the upper end of the shell section 29 so as to close the upper end of the passage 35, and said skirt terminates with its lower end below the static fluid level in the well, which level may be assumed to be approximately in the plane of the section line 3—3. The upper end portion of the primary annular air intake passage is open to atmosphere through numerous perforations 36' in the shell 29. For the purpose of providing a contracted neck portion adjacent the terminal end of the primary inlet passage 35 the upper wall of the cup 30, which forms the lower outside wall portion of said passage, is contracted at 37. Intake air is discharged from the primary air inlet passage 35 downwardly into the outer peripheral portion of the liquid well wherefrom the air changes its direction of travel and passes upwardly through an annular secondary air inlet passage 38 that is defined by spaced annular conical baffles 40 and 41 and the element 30. The annular conical baffle 41 is rigidly secured to the bottom of the oil well-forming cup 30 and forms therewith a kind of oil cup within the oil well. The interior of this inner cup is in communication with the interior of the cleaner at its open upper end and is in communication with the oil well proper of the cleaner through restricted oil passages 42. The lower peripheral portion of the upper conical baffle 40 is formed to provide a vertically disposed flange 40' that is radially inwardly spaced from the lower end of the skirt 36 to define with said skirt a narrow annular liquid return passage 43 that opens into the secondary air inlet passage just beyond the restricted throat 37 and is subject to high sub-atmospheric pressure produced by the expanding air stream passing this point.

Figure 3:
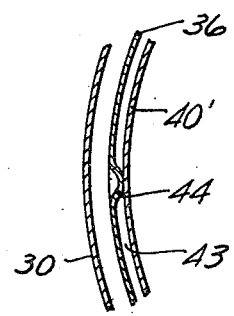
Fig. 3 is a detail fragmentary sectional view taken on the line 3—3 of Fig. 2.
Figure 5:
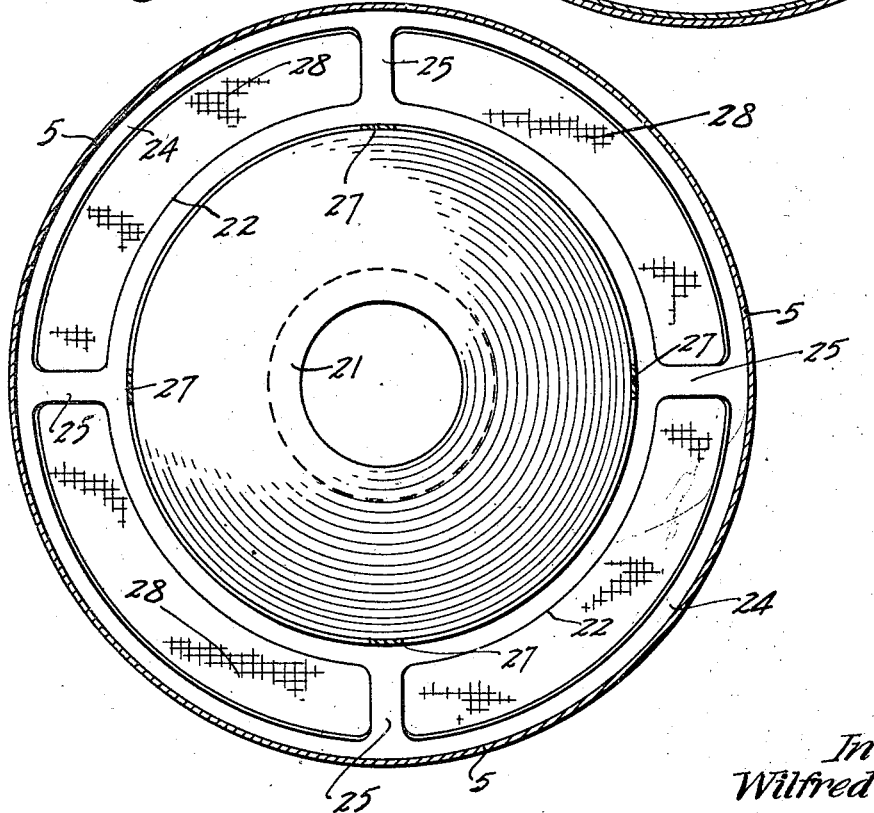
Fig. 5 is a transverse horizontal sectional view taken on the irregular line 5—5 of Fig. 1.

For supporting the baffle element 41, the skirt 36 is inwardly pressed at circumferentially spaced points to provide small anchoring lugs 44 that are welded to the flange 40' of baffle 40, see particularly Fig. 3. The oil return passage 43 may be said, however, to be substantially completely annular throughout its length and is completely annular at its discharge end. Furthermore, the lugs 44 are preferably so small in diameter that oil will flow therearound and discharge from the return passage 43 in completely annular form.

The minimum cross-sectional area of the secondary air inlet passage 38 exceeds that of the main or restricted portions of the primary air inlet passage and, of course, the minimum cross-sectional area of the liquid return passage 43 is much less than any portion of the primary or secondary air passages.

Spanning the opening through the axial upper end of baffle 40 is a downwardly and outwardly sloping conical, sieve-like element 45 that is highly and closely perforated and is preferably made up of a plurality of closely stacked conical wire screens. The screens forming the baffle 45 rest upon the peripheral upper edge portion of the baffle 40 and are shown as extending from thence to the skirt 36 but this is done more for the purpose of convenience than function.

The expansion chamber of the cleaner overlies the oil well, and the sides thereof are defined by the skirt 36.

This expansion chamber preferably contains a highly perforate oil intercepting element or filter composed of a plurality of stacked corrugated screens 46 similar to the screens described in connection with Fig. 1. These screens are shown in Fig. 2 as being held against upward displacement by an annular flange 47 and are supported by downward displacement by the conical perforate baffle 45, on which the lower screen element 46 is seated.

*Operation of Fig. 2*

Assuming now that the air cleaner of Fig. 2 has its outlet sleeve 34 connected by a suitable conduit to the air intake of an internal combustion engine, for example, the operation thereof will be substantially as follows:

When the engine is started, the cleaner will be subject to a sub-atmospheric pressure or suction which will cause air under atmospheric pressure to rush in through the numerous perforations 36' and down the primary annular air inlet passage 35. This air will move downwardly in the passage 35 at high velocity and will have its velocity greatly increased at its terminal end due to the restriction in the passage afforded by the throat 37 and will then be discharged downwardly into the peripheral portion of the liquid well forming part of the secondary air inlet passage 38. Upon entering the secondary air inlet passage, the air will rapidly expand and change its direction of travel, passing upwardly through said passage 38 and entering the expansion chamber through the diagonally disposed surfaces of the intercepting screen baffle 45, further expansion taking place within the expansion chamber just outward of the secondary passage 38. Most of the liquid normally in the secondary passage 38 under static conditions of the device will be entrained with the air and carried upwardly therewith over the edges of baffles 40 and 41. As the air expands over the edges of baffles 40 and 41, such air as expands in a radially inward direction will tend to throw out of the air stream part of the oil entrained therewith, see dotted arrows in Fig. 2, which indicate roughly the courses taken by oil. It will be noted that oil projected over the open end of the inner cup 41 will tend to gravitate into said cup 41 from which it could return to the secondary air inlet passage through the metering openings or passages 42. On the other hand, that part of the air which tends to expand radially outwardly as it leaves the edge of baffle 40 will have a tendency to throw entrained oil radially outwardly into a quiescent zone overlying the baffle 40, and this latter tendency will be very strong irrespective of the action of but will be increased by perforate baffle 46. An exceptionally high percentage of the total liquid carried into the expansion chamber will be removed in the manner above described from the air stream within or within the immediate vicinity of the oil washing zone and will be largely completed independently of the intercepting elements 46, there being no necessity for a tight packed filter either for the purpose of increasing the efficiency or removing the excess liquid from the air stream. Of course, as previously indicated, the conical perforate baffle 45 will increase the efficiency of the oil separating action just as in the case of the baffle 28 of Fig. 1. That is, oil will produce films over the openings of the screen mesh of screens 46 and upon breaking of the films the globules of oil created will tend to move away from the screen in a direction at right angles to the outer surface thereof which is diagonally outwardly of the direction of air flow and toward the quiescent zone over baffle 40. A head of oil will be built up in the quiescent zone below and sometimes even above the upper edge of baffle 40 and this head of oil will be subject not only to gravity action but to suction produced below the oil return passage 43 so that the rapid circulation of cleaning liquid will be maintained from the liquid well upwardly through the secondary passage 38 and downwardly through the quiescent zone back to the liquid well. In fact, the annular return stream of oil through passage 43 will come at such high velocity that a large part thereof will pass entirely across the secondary inlet passage 38 and will flow up the outer wall of baffle 41. In experiments with these cleaners it is found that a large part of the dust and all the heavier particles thereof are impinged against oil in the bottom of the well or moving up the sides of baffle 41, and that most of the rest of the dust will be coated with oil and carried back to the oil well by oil that is ejected from the air stream below or in the lower extremities of that portion of the expansion chamber containing elements 46.

What I claim is:

1. In an air cleaner of the liquid bath type, spaced cylindrical walls providing an outer casing with an air inlet passage leading downwardly into its lower portion and a concentrically located chamber leading upwardly from the lower portion of the casing, means closing the bottom of the casing to provide a liquid reservoir in its lower portion having its bottom spaced below the discharge end of the inlet passage and wherein air passing from the inlet passage to said chamber reverses its direction around the discharge end of the inlet passage, a filter in the upper portion of the chamber with its bottom materially spaced upwardly from the discharge end of the inlet passage and from the normal fluid level in the fluid reservoir, an air outlet from the upper portion of the casing above the filter, and a centrally apertured baffle wall of generally conical shape disposed concentrically with respect to and adjacent to the discharge end of the inlet passage and providing a liquid collecting zone thereabove, the lower marginal edge of said baffle wall being generally spaced from a marginal edge portion of the discharge end of a wall of said inlet passage to define therewith a narrow substantially annular liquid return passage from said liquid collecting zone to the air stream at a place immediately adjacent to but posterior to the said marginal edge portion of the inlet passage wall, said baffle wall extending upwardly from its lower marginal edge to a height materially above the discharge end of the inlet passage but below the filter element.

2. The structure defined in claim 1 in which the said inlet passage is constricted immediately adjacent its discharge end portion to thereby increase the air velocity past the liquid return passage.

3. The structure defined in claim 1 in further combination with a sieve-like element of generally conical shape disposed in the chamber space between said centrally apertured baffle wall and said filter with its lower edge disposed in the liquid collecting space above the baffle wall.

WILFRED W. LOWTHER.